(12) United States Patent
Tanaka

(10) Patent No.: US 9,621,826 B2
(45) Date of Patent: Apr. 11, 2017

(54) IMAGE SENSOR AND IMAGE CAPTURING APPARATUS

(71) Applicant: CANON KABUSHIKI KAISHA, Tokyo (JP)

(72) Inventor: Masanori Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 14/679,459

(22) Filed: Apr. 6, 2015

(65) Prior Publication Data
US 2015/0296155 A1     Oct. 15, 2015

(30) Foreign Application Priority Data

Apr. 10, 2014  (JP) ................................. 2014-081435

(51) Int. Cl.
| | |
|---|---|
| *H04N 5/343* | (2011.01) |
| *H04N 5/347* | (2011.01) |
| *H04N 5/355* | (2011.01) |
| *H04N 5/3745* | (2011.01) |

(52) U.S. Cl.
CPC .............. *H04N 5/343* (2013.01); *H04N 5/347* (2013.01); *H04N 5/3559* (2013.01); *H04N 5/37452* (2013.01)

(58) Field of Classification Search
None
See application file for complete search history.

(56) References Cited

FOREIGN PATENT DOCUMENTS

JP     2010-259027 A     11/2010

*Primary Examiner* — Roberto Velez
*Assistant Examiner* — Yih-Sien Kao
(74) *Attorney, Agent, or Firm* — Cowan, Liebowitz & Latman, P.C.

(57) ABSTRACT

An image sensor having a pixel unit in which a plurality of pixels are two-dimensionally arranged, and a scanning unit that selects row or rows and causes signals to be output from pixels in the selected row or rows, each of the pixels comprising: a photoelectric converter; a storage portion; a transfer portion configured to transfer a signal charge generated by the photoelectric converter to the storage portion, if each of the pixels is included in the selected row or rows; and an output portion configured to output a pixel signal corresponding to the signal charge transferred to the storage portion. In a merged readout mode, a capacitance of the storage portion of a pixel in a row or rows except a predetermined row among the plurality of selected rows is different from that in the predetermined row.

14 Claims, 13 Drawing Sheets

F I G. 2
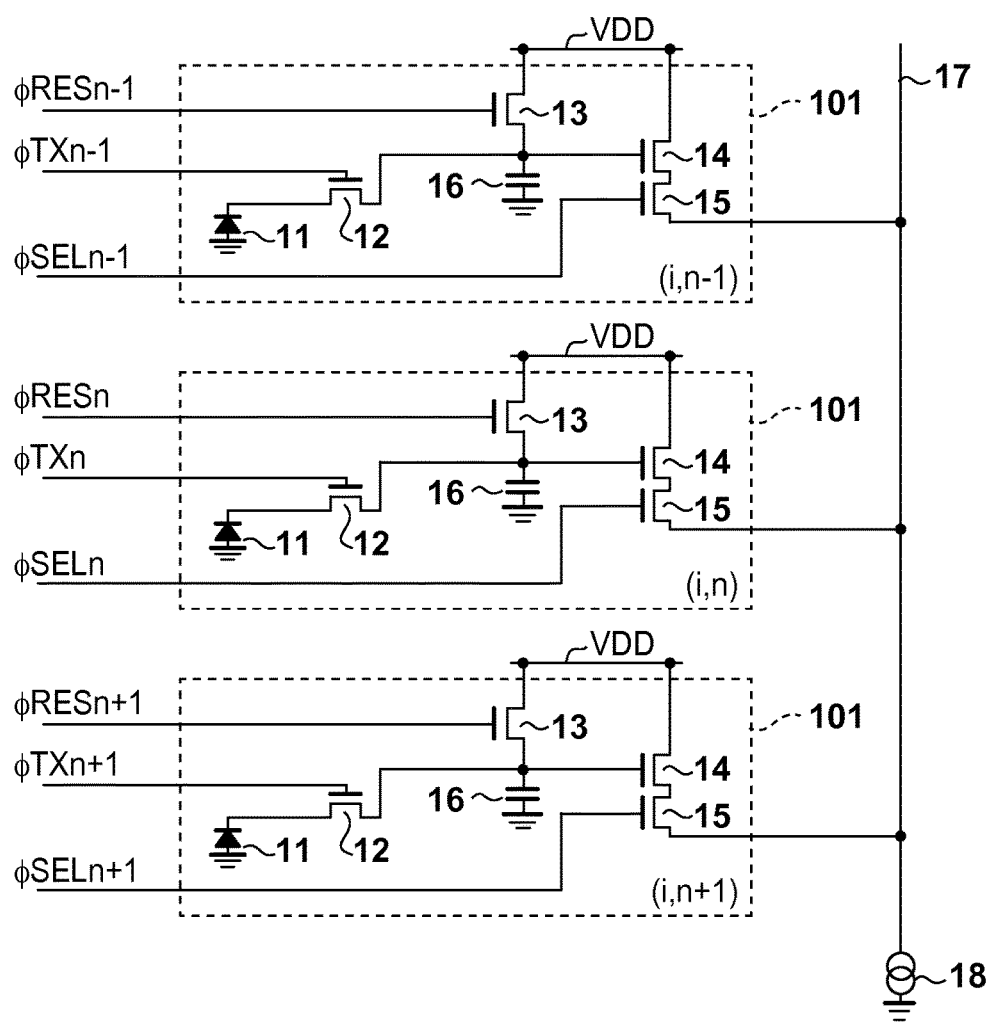

F I G. 10
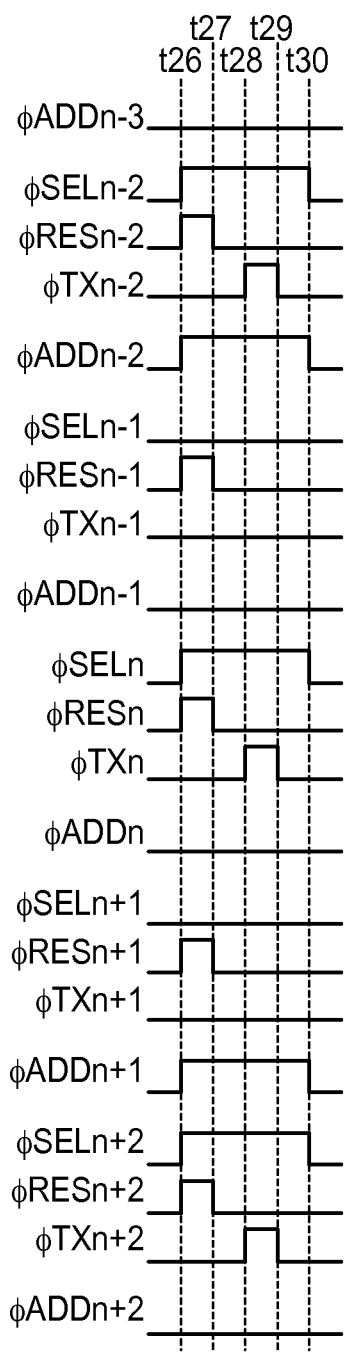

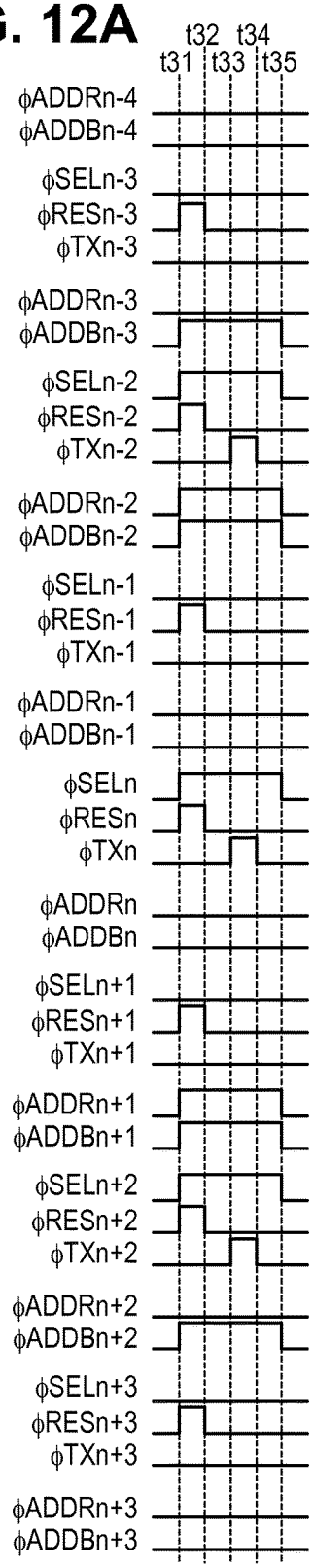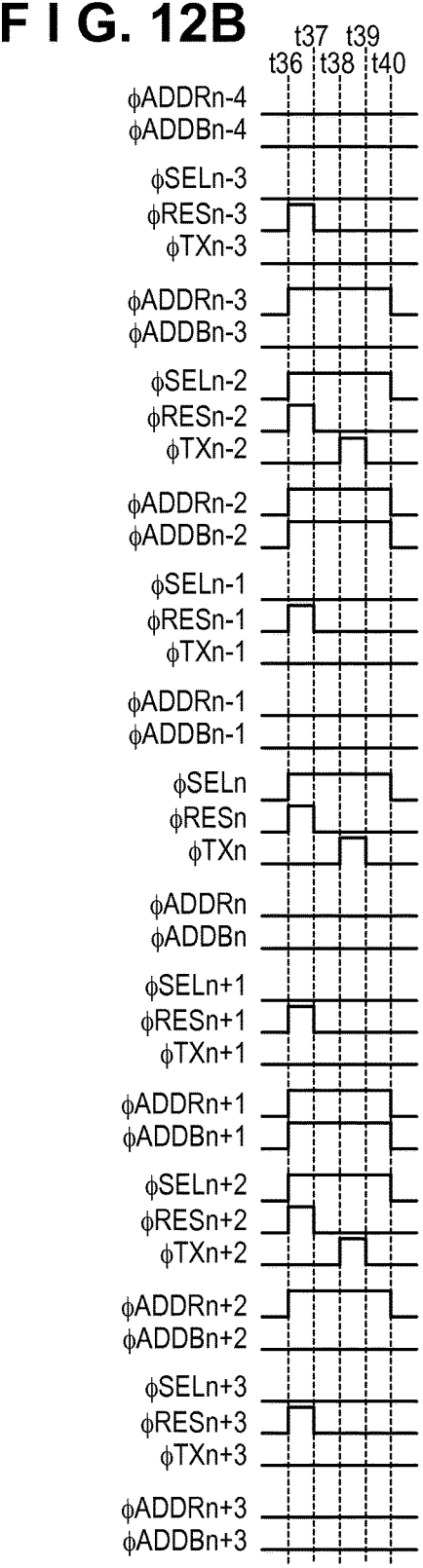

IMAGE SENSOR AND IMAGE CAPTURING APPARATUS

BACKGROUND OF THE INVENTION

Field of the Invention

The present invention relates to an image sensor and an image capturing apparatus using the image sensor.

Description of the Related Art

The number of pixels in a CMOS image sensor in a recent digital camera has been increasing, whereas there is also an increasing need for the image sensing in which an image with a high-number of pixels is output at a high frame rate, as in the case of a Full HD moving image which is a 1920×1080 image output at 30 fps or 60 fps, for example.

With regard to this need, thinning processing is known as a method for reducing in the number of pixels in order to achieve the image sensing at a high frame rate using a CMOS image sensor having a high-number of pixels. In the thinning processing, the number of pixels is decreased by performing drive control so as not to read out signals from pixels in a given cycle, and an increase in the frame rate is achieved by reducing the data rate. Since signals are not read out from pixels in a given cycle in this processing, a captured image has characteristics, that is, the image is advantageous in edge detection for a subject, but meanwhile, moiré, which is a kind of folding noise, tends to stand out.

As a method for reducing moiré, some methods have been proposed in which a signal of a pixel that is not read out in the thinning processing is merged with a signal of an adjoining signal to decrease the number of pixels, and the merged signal is output. In pixel merging processing disclosed in Japanese Patent Laid-Open No. 2010-259027, processing for merging pixel signals from a plurality of rows is performed by simultaneously selecting a plurality of rows using a row selection circuit, and simultaneously outputting signals from the plurality of selected rows. With the above method, an effect of reducing moiré and causing random noise to converge is achieved by obtaining merged output of the plurality of pixels. Due to this effect, in general, the pixel merging processing in which pixel signals are merged in a CMOS image sensor to decrease the number of pixels is superior to simple thinning processing, in terms of image quality.

However, with the pixel merging processing, the edge of a subject blurs, resulting in an image with low perceived resolution.

SUMMARY OF THE INVENTION

The present invention has been made in consideration of the above situation, and obtains an image having image quality with high perceived resolution while reducing moiré, in a case where decreasing the number of pixels of an image and reading out an image from an image sensor.

According to the present invention, provided is an image sensor having a pixel unit in which a plurality of pixels are two-dimensionally arranged, and a scanning unit that selects pixels in the pixel unit in units of row and causes signals to be output from pixels in the selected row or rows, each of the pixels comprising: a photoelectric converter configured to generated signal charge corresponding to an amount of incident light; a storage portion configured to store a charge; a transfer portion configured to transfer a signal charge generated by the photoelectric converter to the storage portion, if each of the pixels is included in the row or rows selected by the scanning unit; and an output portion configured to output a pixel signal corresponding to the signal charge transferred to the storage portion, wherein, in a merged readout mode in which a plurality of rows are selected at a time by the scanning unit, pixels signals output from pixels in the selected rows are merged in each column and the merged pixel signal is read out, a capacitance of the storage portion of a pixel in row or rows except a predetermined row among the plurality of selected rows is different from a capacitance of the storage portion in a pixel in the predetermined row.

Further, according to the present invention, provided is an image capturing apparatus comprising: the image sensor as described above; and a processing unit configured to process a pixel signal output from the image sensor.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a diagram showing a circuit configuration of pixels according to the first embodiment;

FIG. 10 is a timing chart showing driving in a merged readout mode according to the third embodiment;

FIGS. 12A and 12B are timing charts showing driving in a merged readout mode according to the fourth embodiment;

DESCRIPTION OF THE EMBODIMENTS

Exemplary embodiments of the present invention will be described in detail in accordance with the accompanying drawings.

First Embodiment

Figure 1:
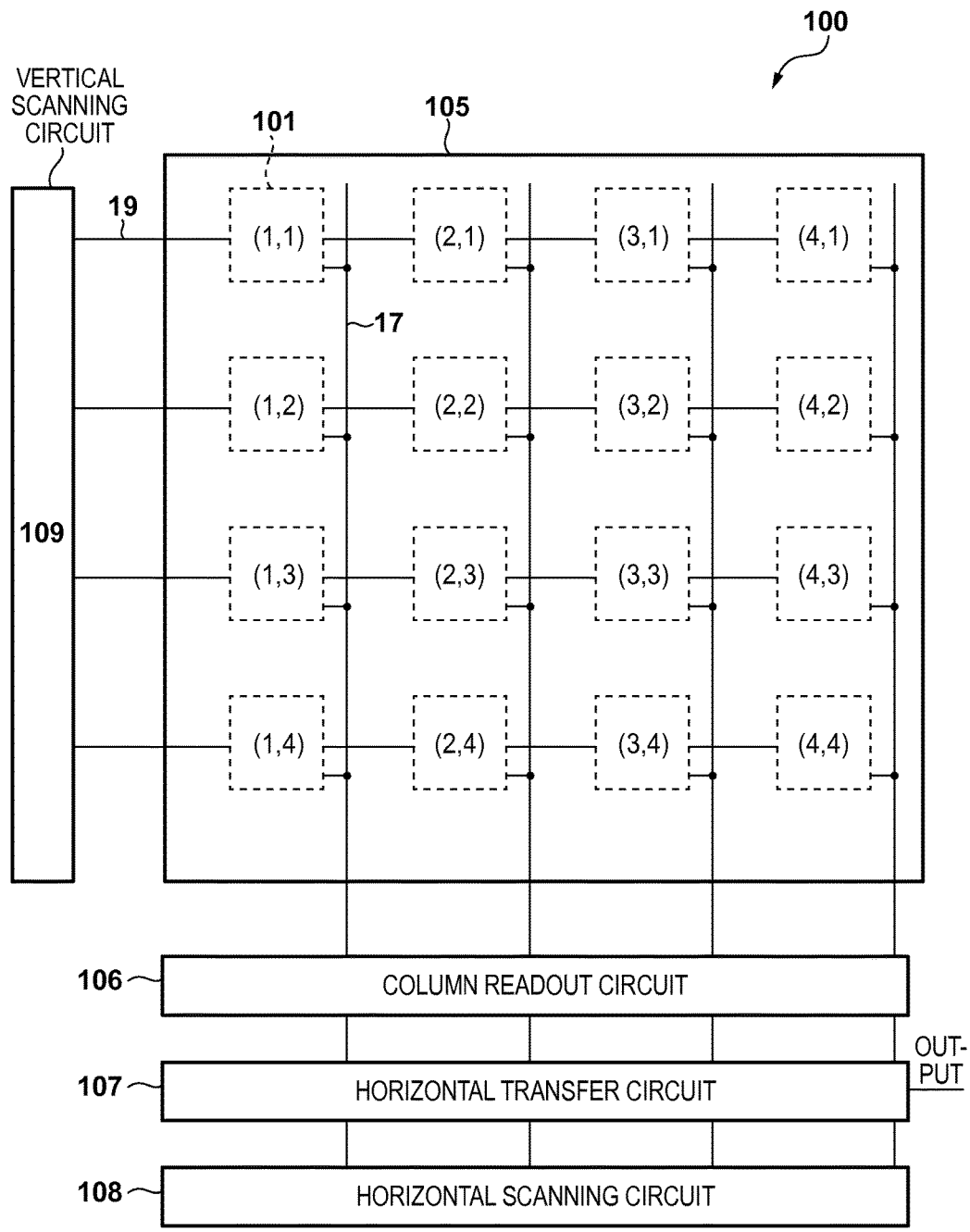
FIG. 1 is a diagram showing a configuration of an image sensor according to a first embodiment of the present invention.

Hereinafter, a first embodiment of the present invention will be described with reference to FIGS. 1 to 5. FIG. 1 is a diagram showing a schematic configuration of an image sensor 100 according to the first embodiment, and a CMOS image sensor is used here. The image sensor 100 has a pixel unit 105, a column readout circuit 106 including a plurality of column circuits provided for respective columns of a pixel circuit, a horizontal transfer circuit 107, a horizontal scanning circuit 108, and a vertical scanning circuit 109.

The pixel unit 105 has a plurality of pixels 101 that are two-dimensionally arranged. Although FIG. 1 shows 4×4 pixels 101(i, j) (i=1 to 4, j=1 to 4) for the purpose of description, the pixel unit 105 is constituted by a larger number of pixels in practice. The pixels 101 are driven through drive control lines 19, each being provided in common in the corresponding row, and the pixels 101 each output a reset signal and an image signal to a vertical output line 17 provided for each column.

The vertical scanning circuit 109 drives the pixels 101 through the drive control lines 19, and controls readout of the reset signal and the image signal in units of rows. The column readout circuit 106 extracts a photoelectric conversion signal of each column from a difference between the reset signal and the image signal that are output to the corresponding vertical output line 17, and outputs the extracted signal to the horizontal transfer circuit 107. The horizontal transfer circuit 107 is driven by the horizontal scanning circuit 108, and sequentially outputs the photoelectric conversion signal for one row that is output from the column readout circuit 106.

Next, a detailed configuration of the pixels 101 will be described using FIG. 2. FIG. 2 shows a circuit configuration of the pixels 101 according to the first embodiment. Each pixel 101 has a photodiode (PD) 11, a transfer switch 12, a reset switch 13, a source follower amplifier (SF) 14, a row selection switch 15, and a floating diffusion portion (FD) 16.

The PD 11 generates a charge corresponding to the amount of incident light by performing photoelectric conversion, and accumulates the charge. The charge accumulated in the PD 11 is transferred to the FD 16 by the transfer switch 12. The reset switch 13 controls reset of an unnecessary charge accumulated in the PD 11 and the FD 16.

A signal charge accumulated in the FD 16 is converted into voltage in accordance with a capacitance thereof, and is input as signal voltage to a gate of the SF 14. The row selection switch 15 controls connection of the output of the SF 14 to the corresponding vertical output line 17. The SF 14 in the row selected by the row selection switch 15 is driven via the vertical output line 17 by a load constant current source 18 included in the column readout circuit 106, and outputs a signal corresponding to the signal voltage that is input to the gate of the SF 14.

A signal φTX, a signal φRES, and a signal φSEL are supplied from the vertical scanning circuit 109 to the transfer switch 12, the reset switch 13, and the row selection switch 15, respectively, thereby driving the corresponding pixel 101. Note that, when a signal or a configuration "of an $n^{th}$ row" is specified in the following description, a suffix "n" will be added at the end of the reference numeral denoting the signal or configuration. For example, "a signal φTX of the $n^{th}$ row" will be written with the suffix n as "a signal φTXn". Similarly, a suffix "n−1" will be added to indicate "an n−1$^{th}$ row", and a suffix "n+1" will be added to indicate "an n+1$^{th}$ row".

The first embodiment provides a normal readout mode of causing a pixel signal to be output row-by-row, and a merged readout mode of causing signals to be simultaneously output from the pixels 101 in a plurality of rows. The vertical scanning circuit 109 controls ON/OFF of the row selection switch 15 of the pixel unit 105 in accordance with the selected mode.

Specifically, in the case of the normal readout mode, only the row selection switch 15 in a pixel row to which the vertical scanning circuit 109 outputs the signal φSEL is turned on. For example, when outputting a signal of the pixel 101(i, n) in the $n^{th}$ row, φSELn is set to "H" to turn on the row selection switch 15.

On the other hand, in the merged readout mode, row selection switches 15 of the pixels 101 whose pixel outputs are to be merged in a plurality of rows are simultaneously turned on. For example, when merged output of three pixels in the n−1$^{th}$ row, the $n^{th}$ row, and the n+1$^{th}$ row is to be obtained, φSELn−1, φSELn, and φSELn+1 are simultaneously set to "H" to turn on the row selection switches 15n−1, 15n, and 15n+1. Three SFs, namely the SFs 14n−1, 14n, and 14n+1 are thereby simultaneously connected to the vertical output line 17, and the pixel outputs are merged. At this time, in order to enhance the perceived resolution of an image to be obtained, weighting is performed on a signal of a center pixel among the pixels whose output signals are to be merged. For example, when obtaining a merged output signal of three vertically-arranged pixels 101(i, n−1), 101(i, n), and 101(i, n+1), if weighting is performed on a signal of the center pixel 101(i, n), the following configuration is employed. That is to say, the ratio of the capacitances Cn−1, Cn, and Cn+1 of the FDs 16n−1, 16n, and 16n+1 is set to 2:1:2. If the FDs 16 are configured so as to have these capacitances, the charge-voltage conversion ratio of the FDs 16n−1, 16n, and 16n+1 is 1:2:1.

Thus, when merging output signals in units of three vertically-arranged pixels 101 and reading out the merged signal in the merged readout mode, the capacitances of the FDs 16 in the pixels 101(i, n−1) and 101(i, n+1) in the rows above and below the center row are set larger than that of the pixel 101(i, n) in the center row. A method for a decrease in the number of pixels can thereby be achieved in which weighting is performed on a signal of a pixel in the center row among the three rows from which signals are to be read out. Note that, when thus reading out in units of three rows, n is expressed as n=3×k+2 (k=0, 1, 2 . . . ).

Incidentally, in the case where the charge-voltage conversion ratio of the pixels 101(i, n−1), 101(i, n), and 101(i, n+1) is 1:2:1, output ranges of the signals also have a ratio of 1:2:1. Accordingly, the output range of the pixels 101(i, n−1) and 101(i, n+1) in the rows above and below the center row in the normal readout mode is ½ with respect to the output range of the pixel 101(i, n) in the center row. The output range in the merged readout mode is ⅔ with respect to the output range of the center pixel 101(i, n) in the normal readout mode.

Figure 3:
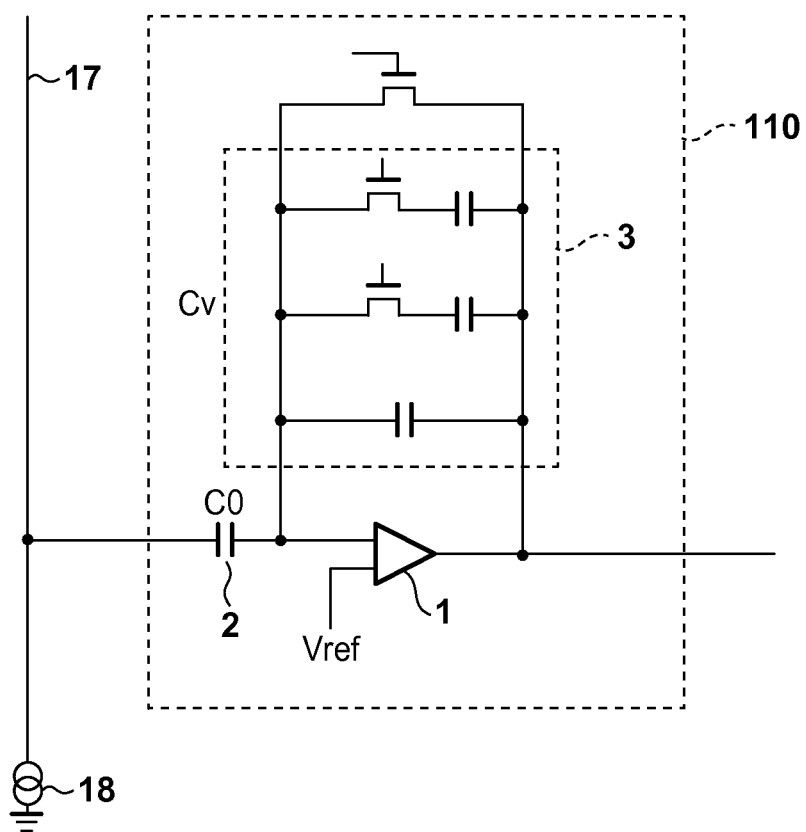
FIG. 3 is a diagram showing a circuit configuration of a correction circuit according to the first embodiment.

For this reason, in the first embodiment, a correction circuit 110 for making uniform the output ranges is provided for each column of the column readout circuit 106. FIG. 3 is a diagram showing a configuration of the correction circuit 110 provided in the column readout circuit 106. The correction circuit 110 has a column amplifier 1, a clamp capacitor 2, and a variable capacitor 3. The clamp capacitor 2 and the variable capacitor 3 are connected to the column amplifier 1 as shown in FIG. 3, and the column amplifier 1 outputs a signal that is output to the vertical output line 17, after applying a gain thereto. With the clamp capacitor 2 and the variable capacitor 3, the amplification ratio of the column amplifier 1 can be determined based on the ratio between these two capacitances. For example, assuming that the capacitances of the clamp capacitor 2 is C0 and the capacitance of the variable capacitor 3 is Cv, if a gain of 1.5 is to be applied, Cv=2/3×C0 is set.

Note that, instead of correcting the output range using the correction circuit 110 provided in the column readout circuit 106, it is also possible to perform correction using, for example, an image processing unit (not shown) or the like provided downstream of the output of the image sensor 100. Accordingly, when correcting the output range with other configurations, the correction circuit 110 does not necessarily have to be provided.

Figure 5:
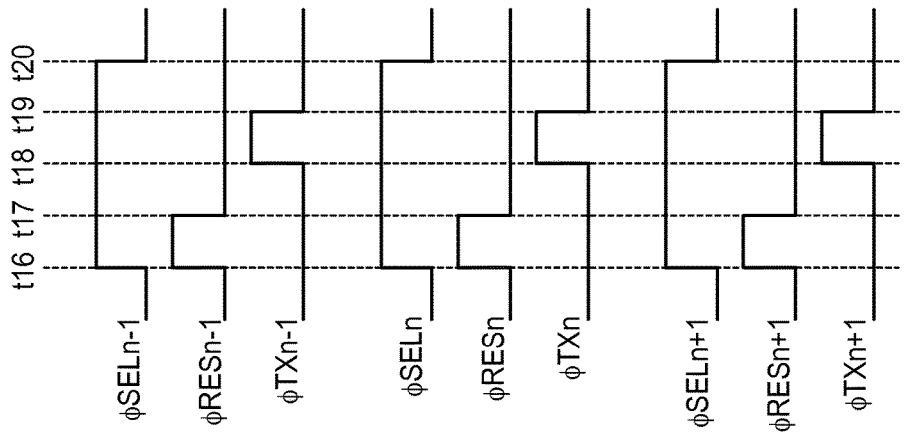
FIG. 5 is a timing chart showing driving in a merged readout mode according to the first embodiment.

Next, a description will be given, with reference to FIGS. 4 and 5, of driving of the pixels 101 having the circuit configuration shown in FIG. 2 in the normal readout mode, and driving thereof in the merged readout mode according to the first embodiment.

Figure 4:
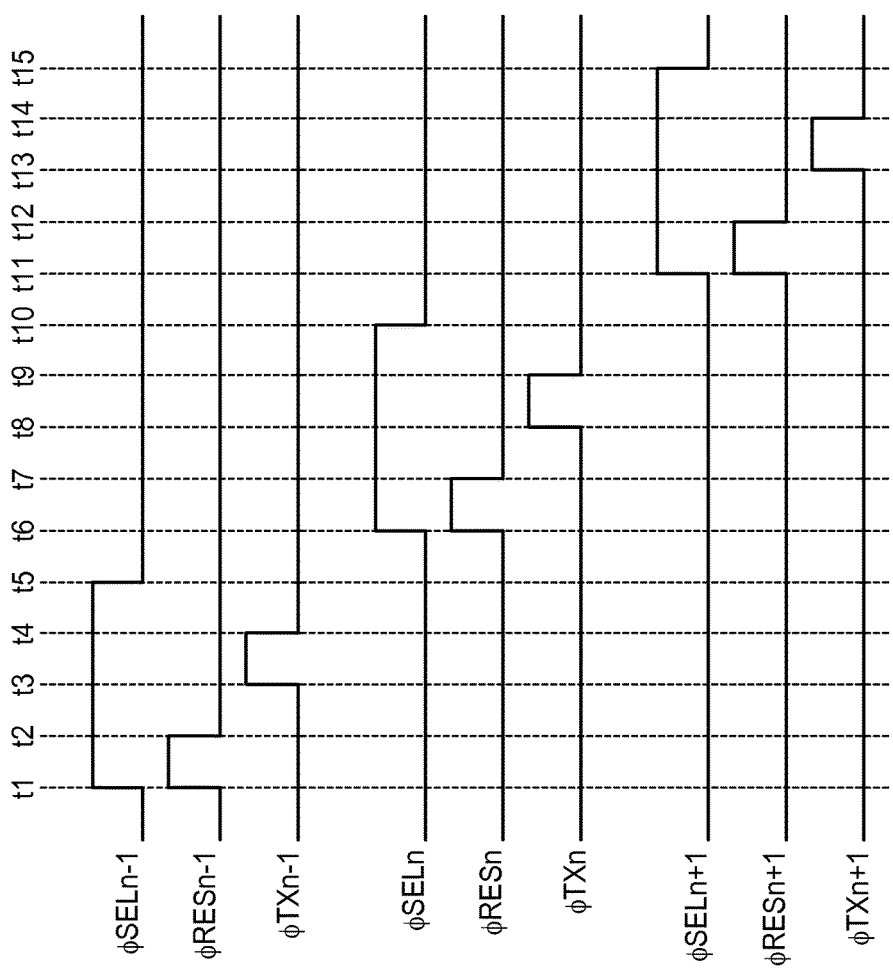
FIG. 4 is a timing chart showing driving in a normal readout mode according to the first embodiment.

FIG. 4 is a timing chart showing driving in the normal readout mode, and driving is performed so as to sequentially read out pixel signals row-by-row from the n−1$^{th}$ row to the n+1$^{th}$ row. Initially, in the period from time t1 to time t5, the signal φSELn−1 is set to "H", and the row selection switch 15n−1 is thereby turned on. In this period, a pixel signal of the n−1$^{th}$ row is output.

In the period from time t1 to time t2, a signal φRESn−1 is set to "H", the reset switch 13n−1 is turned on, and reset voltage is applied to the FD 16n−1. In the period from time t2 to time t3, the reset voltage of the FD 16n−1 is output to the correction circuit 110 through the SF 14n−1 and the vertical output line 17. In the period from time t3 to time t4, a signal φTXn−1 is set to "H", the transfer switch 12n−1 is turned on, and a signal charge accumulated in the PD 11n−1 as a result of image sensing of a subject image is transferred to the FD 16n−1. In the period from time t4 to time t5, the transferred signal voltage of the FD 16n−1 is output to the correction circuit 110 through the SF 14n−1 and the vertical output line 17. Note that, in the signal output from the n−1$^{th}$ row, i.e., the signal output of the pixel 101n−1, Cv=1/2×C0 is set since the gain applied by the correction circuit 110 is 2.

As a result of the above driving, a signal is output from the pixel 101(i, n−1) in a single row. Similarly, signal output from the n$^{th}$ row and signal output from the n+1$^{th}$ row are performed from time t6 to time t10 and from time t11 to time t15, respectively. In the signal output from the n$^{th}$ row, i.e., the signal output of the pixel 101(i, n), Cv=C0 is set since the applied gain is 1. In the signal output from the n+1$^{th}$ row, i.e., the signal output of the pixel 101(i, n+1), Cv=1/2×C0 is set since the applied gain is 2.

Next, driving in the merged readout mode will be described. FIG. 5 is a timing chart showing driving in the merged readout mode. Initially, in the period from time t16 to time t20, signals φSELn−1, φSELn, and φSELn+1 are set to "H", and the respective row selection switches 15n−1, 15n, and 15n+1 are thereby turned on. In this period, merged output of signals of three vertically-arranged pixels in the n−1$^{th}$ row, the n$^{th}$ row, and the n+1$^{th}$ row is performed. However, if the pixel unit 105 has Bayer pattern color filters, output signals of the pixels 101 having color filters of the same color that are arranged in every two rows are merged.

In the period from time t16 to time t17, signals φRESn−1, φRESn, and φRESn+1 are set to "H", the respective reset switches 13n−1, 13n, and 13n+1 are turned on, and reset voltage is applied to the FDs 16n−1, 16n, and 16n+1. In the period from time t17 to time t18, the reset voltages of the FDs 16n−1, 16n, and 16n+1 are merged on the vertical output line 17 through the respective SFs 14n−1, 14n, and 14n+1, and the merged voltage is output to the correction circuit 110.

In the period from time t18 to time t19, signals φTXn−1, φTXn, and φTXn+1 are set to "H", and the respective transfer switches 12n−1, 12n, and 12n+1 are turned on. Signal charges accumulated in the PDs 11n−1, 11n, and 11n+1 due to the image sensing of a subject image are thereby transferred to the respective FDs 16n−1, 16n, and 16n+1. In this period, since the signal charges are transferred to the FDs 16n−1, 16n, and 16n+1, a voltage variation that depends on the FD capacitances Cn−1, Cn, and Cn+1 of the pixels 101 occurs in the respective FDs 16n−1, 16n, and 16n+1. In the period from time t19 to time t20, the transferred signal voltages of the FDs 16n−1, 16n, and 16n+1 are averaged in the vertical output line 17 through the SFs 14n−1, 14n, and 14n+1, and the averaged voltage is output to the correction circuit 110. Note that, in the merged output of the pixels 101(i, n−1), 101(i, n), and 101(i, n+1), Cv=2/3*C0 is set since the gain applied by the correction circuit 110 is 1.5.

As a result of the above driving, the merging of output signals of the pixels 101 in three rows is performed. Similarly, although not shown in the drawing, the merging of output signals in units of three rows is sequentially performed, such as from n+2$^{th}$ to n+4$^{th}$ rows and from n+5$^{th}$ to n+7$^{th}$ rows.

As described above, in the merging of output signals by simultaneous connection of three SFs, namely the SFs 14n−1, 14n, and 14n+1, values of the voltages input to the gates are averaged. Accordingly, the merging in which the output of the center pixel is weighted can be performed by setting, in advance, the capacitances of the FDs 16n−1 and 16n+1 larger than that of the FD 16n.

Note that, although the merging of output signals of three vertically-arranged pixels has been described above, if the merging of output signals of four pixels, for example, is performed and a merged output signal with weighting at a ratio of 1:3:3:1 is to be obtained, the ratio of the FD capacitances need only be set to 3:1:1:3. If the merging of output signals of five pixels is performed and a merged output signal with weighting at a ratio of 1:4:6:4:1 is to be obtained, the ratio of the FD capacitances need only be set to 12:3:2:3:12.

The aforementioned weighting ratios are examples in the case of using a Gaussian filter, whereas it is preferable that these ratios are determined in accordance with desired image quality, i.e., desired perceived resolution or the degree of moiré. For example, when merging output signals of three pixels, if the center of gravity of the weighting is to be shifted to an end side, the capacitance ratio of the FD capacitances may be set to 1:2:2.

As described above, according to the first embodiment, when performing merged readout, the FD capacitance of a pixel located on an end side is set larger than the FD capacitance of a pixel at the center among the pixels whose output signals are to be merged, and it is thereby possible to obtain a merged output signal in which a signal from the center pixel is weighted. With this configuration, an image having high perceived resolution is expected to be obtained, while reducing moiré.

Second Embodiment

Next, a second embodiment of the present invention will be described with reference to FIGS. 6 to 8. The second embodiment employs a pixel circuit configuration in which the FD capacitance is switched when in the normal readout mode and when in the merged readout mode. Note that the configuration of the image sensor 100 is similar to that described with reference to FIG. 1 in the first embodiment, and accordingly a detailed description thereof will be omitted.

Figure 6:
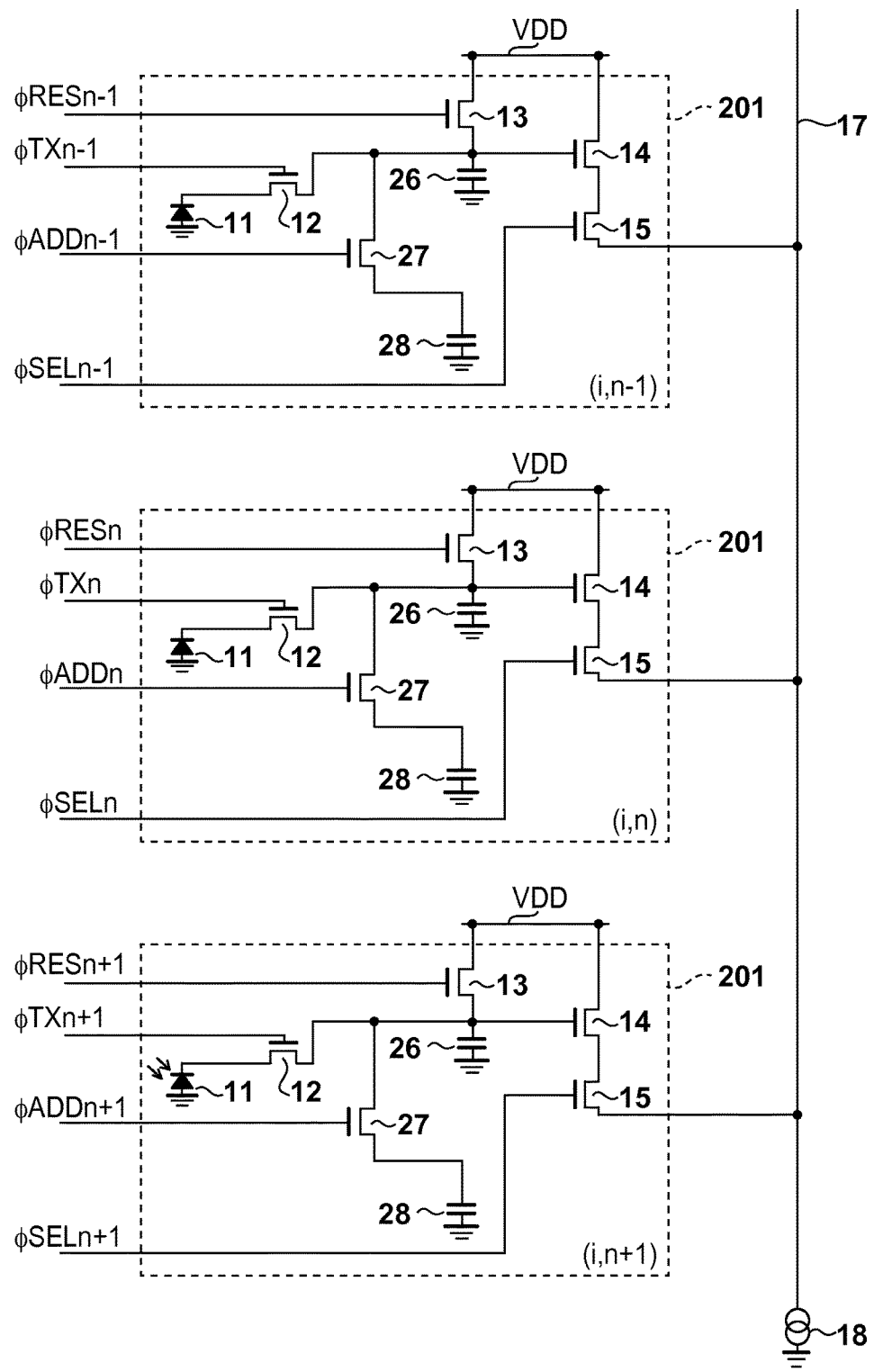
FIG. 6 is a diagram showing a circuit configuration of pixels according to a second embodiment.

FIG. 6 shows a circuit configuration of pixels 201 according to the second embodiment. A difference thereof from the circuit configuration of the pixels 101 according to the first embodiment lies in that the capacitances of FDs 26, which correspond to the FDs 16 in FIG. 2, are the same, additional capacitors 28 are further provided, and connection and disconnection between each FD 26 and the corresponding additional capacitors 28 are switched by a capacitance changeover switch 27. The other configurations are similar to those shown in FIG. 2, and accordingly the same reference numerals will be given thereto and a description thereof will be omitted. Note that, when a signal or a configuration "of an $n^{th}$ row" is specified in the following description, a suffix "n" will be added at the end of the reference numeral denoting the signal or configuration. For example, "a signal φTX of the $n^{th}$ row" will be written with the suffix n as "a signal φTXn". Similarly, a suffix "n−1" will be added to indicate "an $n-1^{th}$ row", and a suffix "n+1" will be added to indicate "an $n+1^{th}$ row".

In the normal readout mode, the charge-voltage conversion ratios of the pixels 201 in the normal readout mode are made uniform by using only the FDs 26. Accordingly, in the normal readout mode in the second embodiment, correction of the output range of each pixel using the correction circuit 110 is not performed.

On the other hand, when in the merged readout mode, as a method for differentiating the FD capacitances of the respective pixels 201, the pixels 201(*i, n−1*), 201(*i, n*), and 201(*i, n+1*) in the second embodiment each have the additional capacitor 28 for increasing the capacitance and the capacitance changeover switch 27, as mentioned above. The capacitance changeover switch 27 is driven by a drive signal φADD from the vertical scanning circuit 109, and connects the additional capacitor 28 to the FD 26 of a pixel 201 whose capacitance is to be increased when in the merged readout mode. Note that, since the correction circuit 110 used when in the merged readout mode has a configuration similar to the configuration described with reference to FIG. 3 in the first embodiment, a description thereof will be omitted.

Next, driving in the merged readout mode will be described. Here, a description will be given of an example of merging output signals of the pixels 201(*i, n−1*), 201(*i, n*), and 201(*i, n+1*) in three rows. Note that, since driving in the normal readout mode does not use φADD and is similar to the driving shown in FIG. 4 in the first embodiment, a description thereof will be omitted.

Figure 7:
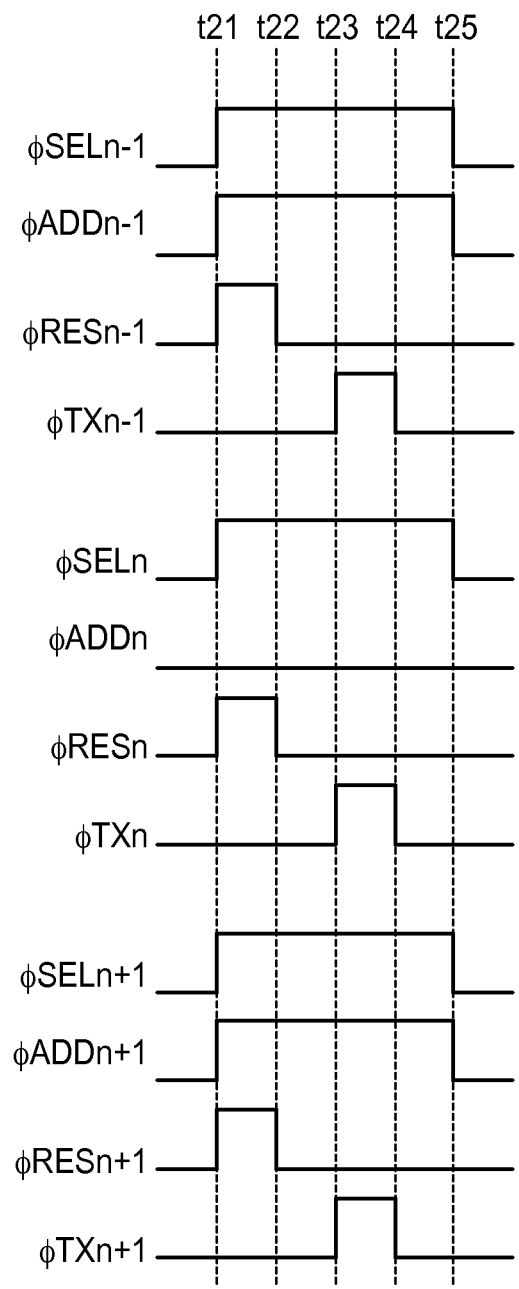
FIG. 7 is a timing chart showing driving in a merged readout mode according to the second embodiment.
Figure 8:
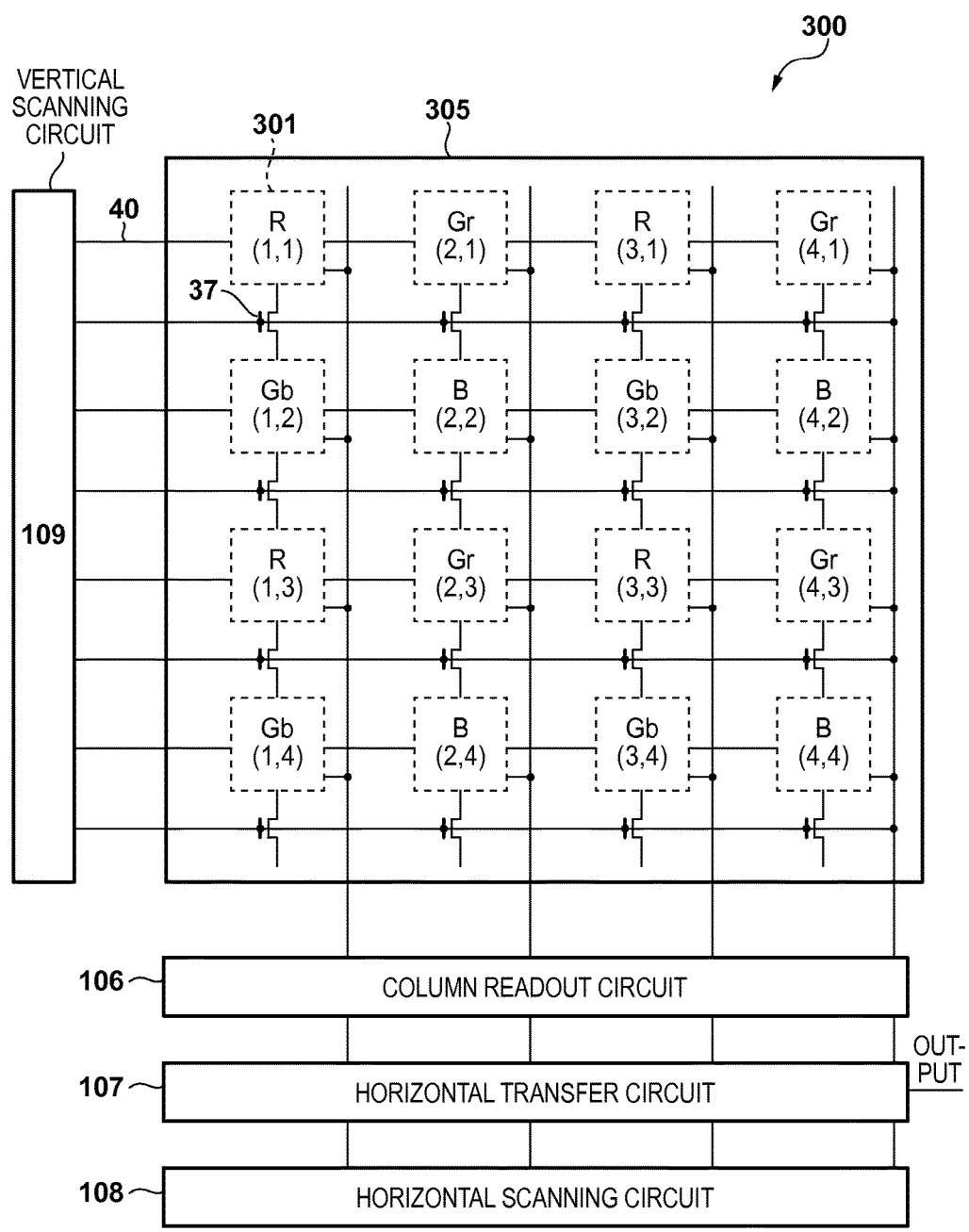
FIG. 8 is a diagram showing a configuration of an image sensor according to a third embodiment.

FIG. 7 is a timing chart showing driving in the merged readout mode according to the second embodiment. Initially, in the period from time t21 to time t25, signals φSELn−1, φSELn, and φSELn+1 are set to "H", and the respective row selection switches 15*n*−1, 15*n*, and 15*n*+1 are thereby turned on. In this period, the merging of signals of three pixels in the n−1$^{th}$ row, the n$^{th}$ row, and the n+1$^{th}$ row is performed. However, if the pixel unit 105 has Bayer pattern color filters, output signals of pixels 101 having color filters of the same color that are arranged in every two rows are merged.

At this time, signals φADDn−1 and φADDn+1 are set to "H", and the FD capacitances in the n−1$^{th}$ row and the n+1$^{th}$ row are increased with respect to the FD capacitance of the pixel 201*n* in the n$^{th}$ row that is at the center of the three rows. Here, assuming that the capacitance of the FD 26 is Cd and the capacitance of the additional capacitor 28 is Ce, the FD capacitance in the n$^{th}$ row is Cd, whereas the FD capacitance in the n−1$^{th}$ row and the n+1$^{th}$ row is Cd+Ce.

The merged output in which the signal of the pixel 201 in the center row is weighted can thereby be obtained.

In the period from time t21 to time t22, signals φRESn−1, φRESn, and φRESn+1 are set to "H", the respective reset switches 13*n*-1, 13*n*, and 13*n*+1 are turned on, and reset voltage is applied to the corresponding FDs 26*n*−1, 26*n*, and 26*n*+1. In the n−1$^{th}$ row and the n+1$^{th}$ row with respect to which the signal φADD is "H", the additional capacitors 28*n*−1 and 28*n*+1 are also simultaneously reset.

In the period from time t22 to time t23, the reset voltages of the FDs 26*n*−1, 26*n*, and 26*n*+1 are averaged in the vertical output line 17 through the SFs 14*n*−1, 14*n*, and 14*n*+1, and the averaged voltage is output to the correction circuit 110.

In the period from time t23 to time t24, signals φTXn−1, φTXn, and φTXn+1 are set to "H", and the respective transfer switches 12*n*−1, 12*n*, and 12*n*+1 are turned on. Signal charges accumulated in the PDs 11*n*−1, 11*n*, and 11*n*+1 due to the image sensing of a subject image are thereby transferred to the respective FDs 26*n*−1, 26*n*, and 26*n*+1. At this time, in the n−1$^{th}$ row and the n+1$^{th}$ row, the signal charges are accumulated in the FDs 26*n*−1 and 26*n*+1 and simultaneously in the additional capacitors 28*n*−1 and 28*n*+1.

Here, assuming that the signal charges of the PDs 11*n*−1, 11*n*, and 11*n*+1 are Qa, Qb, and Qc, respectively, the signal voltages to be input to gates of the SFs 14*n*−1, 14*n*, and 14*n*+1 are Qa/(Cd+Ce), Qb/Cd, and Qc/(Cd+Ce), respectively.

In the period from time t24 to time t25, the above signal voltages are averaged in the vertical output line 17, and the averaged voltage is output to the correction circuit 110. If the output range is to be adjusted to the output range in the normal readout mode with the FD capacitance of Cd, Cv=(3×Cd+Ce)/{3×Cd×(Cd+Ce)}×C0 is set since the applied gain is 3×Cd×(Cd+Ce)/(3×Cd+Ce).

As a result of the above driving, the merging of output signals of the pixels 201 in three rows is performed. Similarly, although not shown in the drawing, the merging of output signals in units of three rows is sequentially performed, such as from n+2$^{th}$ to n+4$^{th}$ rows or from n+5$^{th}$ to n+7$^{th}$ rows.

In the second embodiment, by providing a switch for switching the FD capacitance in each pixel, the charge-voltage conversion ratios of the pixels are made uniform when in the normal readout mode, and the weighting merged output in which the capacitance is changed for each pixel is achieved when in the merged readout mode. For this reason, the correction of the output range performed in the first embodiment after the output of the column readout circuit 106 or the image sensor 100 in the normal readout mode is unnecessary.

Note that, as a method for increasing the FD capacitance, a parasitic capacitance at the time of turning on the transfer switch 12 can also be used. That is to say, when in the merged readout mode, in the period from time t24 to time t25 during which the merged output is performed, signals φTXn−1 and φTXn+1 are set to "H" to turn on the transfer switches 12*n*−1 and 12*n*+1. The FD capacitances of the pixels 201(*i, n−1*) and 201(*i, n+1*) are thereby increased. During this period, a signal φTXn is set to "L" to turn off the transfer switch 12*n*.

As described above, according to the second embodiment, a configuration is employed in which the additional capacitor 28 for increasing the capacitance and the capacitance changeover switch 27 are provided in each pixel 201, and the FD 26 whose capacitance is equal in each pixel is used when in the normal readout mode. The output ranges of the pixels in the normal readout mode can thereby be made uniform. Furthermore, the weighting ratio can be changed by setting connection of the capacitance of the additional capacitor 28 for each pixel.

Modification

Although the additional capacitor 28n in the $n^{th}$ row is not used in the above exemplary driving in the merged readout mode, it may be used for changing the weighting ratio. For example, the capacitances of the additional capacitors 28n−1, 28n, and 28n+1 are set to 2×Cd, Cd, and 2×Cd, respectively, for the respective pixels. When an image having high perceived resolution is to be obtained, the driving shown in FIG. 7 is performed without using the additional capacitor 28n in the $n^{th}$ row. At this time, the FD capacitance in the $n^{th}$ row is Cd, and the FD capacitance in the n−$1^{th}$ row and the n+$1^{th}$ row is 3×Cd, and a weighting ratio of 1:3:1 is obtained. In this case, the gain applied by the correction circuit 110 is 1.8.

On the other hand, in the case of giving priority to the reduction of moiré, the signal φADDn is also set to "H" when in the merged readout mode. At this time, the FD capacitance in the $n^{th}$ row is 2×Cd, and the FD capacitance in the n−$1^{th}$ row and the n+$1^{th}$ row is 3×Cd, and a weighting ratio of 2:3:2 is obtained. Here, the gain applied by the correction circuit 110 is 18/7.

Thus, the weighting ratio can be changed by setting the capacitance of the additional capacitor 28n in the $n^{th}$ row smaller than the capacitance of the additional capacitors 28n−1 and 28n+1 in the n−$1^{th}$ row and the n+$1^{th}$ row.

Third Embodiment

Next, a third embodiment of the present invention will be described with reference to FIGS. 8 to 10. FIG. 8 is a diagram showing a schematic configuration of an image sensor 300 according to the third embodiment, and a CMOS image sensor is used here. In the third embodiment, as a method for switching the FD capacitance with a simpler pixel circuit configuration, a configuration is employed in which adjoining pixels are connected to each other with a capacitance changeover switch 37. Also, in the third embodiment, it is assumed that Bayer pattern color filters are provided in a pixel unit 305, as shown in FIG. 8.

Figure 9:
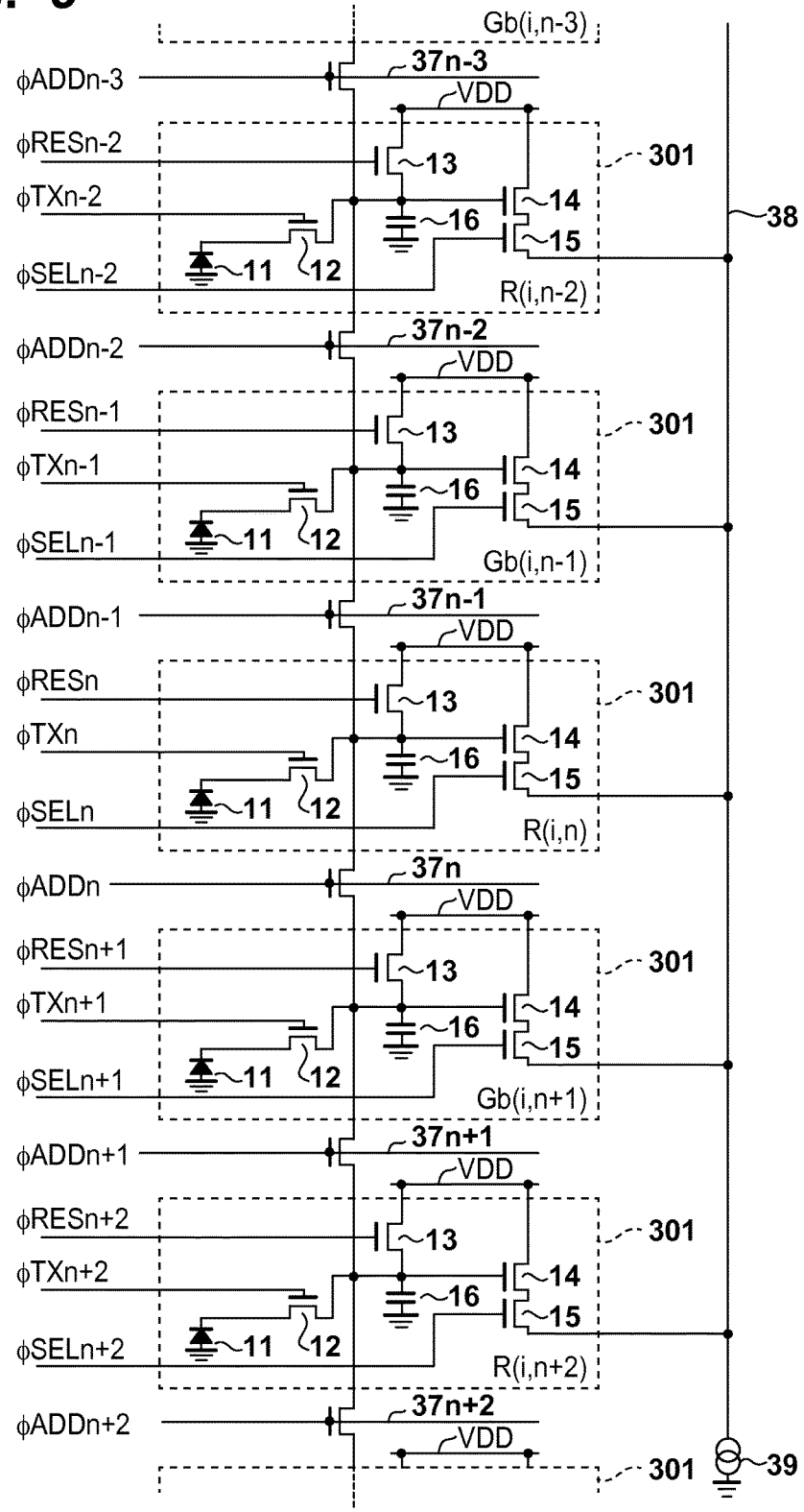
FIG. 9 is a diagram showing a circuit configuration of pixels according to the third embodiment.

FIG. 9 shows a circuit configuration of pixels 301 according to the third embodiment. Note that constituents similar to the constituents described with reference to FIG. 2 in the first embodiment will be given the same reference numerals, and a description thereof will be omitted. When a signal or a configuration "of an $n^{th}$ row" is specified in the following description, a suffix "n" will be added at the end of the reference numeral denoting the signal or configuration. For example, "a signal φTX of the $n^{th}$ row" will be written with the suffix n as "a signal φTXn". Similarly, a suffix "n−1" will be added to indicate "an n−$1^{th}$ row", and a suffix "n+1" will be added to indicate "an n+$1^{th}$ row".

A significant characteristic of the circuit configuration of the pixels 301 according to the third embodiment lies in that the capacitance changeover switch 37 is provided so as to connect the FDs in vertically adjoining pixels 301. That is to say, when focusing on the pixel 301(i, n) in the $n^{th}$ row, two capacitance changeover switches 37n−1 and 37n are connected to the FD 16n. Note that the pixel 301(i, n) is a pixel having an R color filter.

The pixel 301n can use, as additional capacitors, the FD 16n−1 of an adjoining pixel and the FD 16n+1 of the other adjoining pixel, respectively through the capacitance changeover switch 37n−1 and the capacitance changeover switch 37n. However, in the case where the pixels have Bayer pattern color filters, an added pixel group is constituted by nearest pixels having the same color. Accordingly, in the third embodiment, when the merging of output signals is performed using three pixels with the pixel 301(i, n) in the $n^{th}$ row at the center, the pixels to be merged are the pixels 301(i, n−2) and 301(i, n+2) that have the R color filters. Note that the correction circuit 110 in the column readout circuit 106 has a configuration similar to the configuration thereof described with reference to FIG. 3 in the first embodiment, and accordingly a description thereof will be omitted.

FIG. 10 is a timing chart showing driving in the merged readout mode according to the third embodiment. Initially, in the period from time t26 to time t30, signals φSELn−2, φSELn, and φSELn+2 are set to "H", and the respective row selection switches 15n−2, 15n, and 15n+2 are thereby turned on. In this period, the merging and output of signals of three pixels, namely pixels in the n−$2^{th}$ row, the $n^{th}$ row, and the n+$2^{th}$ row are performed. Signals φADDn−2 and φADDn+1 are set to "H", the capacitance changeover switches 37n−2 and 37n+1 are thereby turned on, and the FDs 16n−1 and 16n+1 are connected as additional capacitors to the FDs 16n−2 and 16n+2, respectively. Note that, since the pixels 301(i, n−1) and 301(i, n+1) having the FDs 16n−1 and 16n+1 have Gb color filters and are not read out in the period from time t26 to time t30, the FDs 16n−1 and 16n+1 can be used in this period.

Here, assuming that all values of the capacitances of the FDs 16n−3 to 16n+3 are Cf and are equal, the FD capacitance in the $n^{th}$ row is Cf, whereas the FD capacitance in the n−$2^{th}$ row and the n+$2^{th}$ row is 2×Cf. Incidentally, as the FD to be used as an FD for increasing the capacitance, the FD 16n−3 and the FD 16n+3 may be used in place of the FD 16n−1 and the FD 16n+1, respectively. At this time, φADDn−2 and φADDn+1 are set to "L", and instead, φADDn−3 and φADDn+2 are set to "H". It is thereby possible, in the addition of the pixels 301(i, n−2), 301(i, n), and 301(i, n+2), to perform merged output in which the signal of the pixel 301(i, n) located at the center is weighted.

In the period from time t26 to time t27, signals φRESn−2, φRESn, and φRESn+2 are set to "H", the respective reset switches 13n−2, 13n, and 13n+2 are turned on, and reset voltage is applied to the corresponding FDs 16n−2, 16n, and 16n+2. In the same period, signals φRESn−1 and φRESn+1 for driving the respective reset switches 13n−1 and 13n+1 corresponding to the FDs 16n−1 and 16n+1 are set to "H".

Note that the reset itself can also be performed with the reset switches 13n−2 and 13n+2 through the capacitance changeover switches 37n−2 and 37n+1. If the reset switches 13n−2 and 13n+2 can sufficiently drive the reset of a plurality of FDs 16, the signals φRESn−1 and φRESn+1 may be "L".

In the period from time t27 to time t28, the reset voltages of the FDs 16n−2, 16n, and 16n+2 are averaged in the vertical output line 38 through the respective SFs 14n−2, 14n, and 14n+2, and the averaged voltage is output to the correction circuit 110.

In the period from time t28 to time t29, signals φTXn−2, φTXn, and φTXn+2 are set to "H", and the transfer switches 12n−2, 12n, and 12n+2 are turned on. Signal charges accumulated in the PDs 11n−2, 11n, and 11n+2 due to the image sensing of a subject image are thereby transferred to the respective FDs 16n−2, 16n, and 16n+2. At this time, the signal charges in the pixel 301(i, n−2) in the n−$2^{th}$ row are accumulated in the FD 16n−2 and also simultaneously in the FD 16n−1, and the signal charges in the pixel 301(i, n+2) in the n+2$^{th}$ row are accumulated in the FD 16n+2 and also simultaneously in the FD 16n+1.

Here, assuming that the signal charges in the PDs 11n−2, 11n, and 11n+2 are Qb, Qd, and Qf, respectively, the signal voltages to be input to gates of the respective SFs 14n−2, 14n, and 14n+2 are Qb/(2×Cf), Qd/Cf, and Qf/(2×Cf), respectively.

In the period from time t29 to time t30, the above signal voltages are averaged in the vertical output line 38, and the averaged voltage is output to the correction circuit 110. If the output range is to be adjusted to the output range in the normal readout mode with the FD capacitance of Cf, Cv=2/3×C0 is set since the applied gain is 1.5.

Note that the FD capacitances of the pixels 301(i, n−2) and 301(i, n+2) are affected by various factors, such as parasitic capacitances at the time of turning on the capacitance changeover switches 37n−2 and 37n+1 and a change of parasitic capacitances of the SFs 14n−1 and 14n+1. Accordingly, it is preferable to set the gain to be applied by the correction circuit 110, taking the influence of the aforementioned parasitic capacitances into consideration. As a result of the above driving, the merging of output signals of the pixels 301 in three rows is performed. Similarly, the merging of output signals of Gb pixels is performed.

When merging output signals of Gb pixels, the FD 16 of an R pixel can be used as an FD for increasing the capacitance. Although a detailed description of the driving of Gb pixels in the merged readout mode will be omitted since it is similar to the driving of R pixels, the Gb pixels in the n+1$^{th}$ row, the n+3$^{th}$ row, and the n+5$^{th}$ row are subjected to the output signal merging subsequently to the merging of output signals of the R pixels in the n−2$^{th}$ row, the n$^{th}$ row, and the n+2$^{th}$ row. Subsequently, the merging of output signals of R pixels in the n+4$^{th}$, the n+6$^{th}$ row, and the n+8$^{th}$ row is performed, and then the output signal merging is sequentially performed with n=n+2. It is thereby possible to adjust color centroid pitches of R pixels and Gb pixels at the time of decreasing the number of pixels can be adjusted to equal intervals.

As a result of using an FD of an adjoining pixel that is not used in readout, as an FD for increasing the FD capacitance as in the third embodiment, the additional capacitors 28 can be removed as compared with the circuit configuration in the second embodiment, which contributes to the pixel layout.

Furthermore, with the circuit configuration of the pixels in the third embodiment, each FD can be connected to a plurality of FDs 16 by using each capacitance changeover switch 37 for a plurality of pixels, and various weighting ratios can be produced. For example, two FDs, namely the FDs 16n−3 and 16n−1 are connected to the FD 16n−2 in the n−2$^{th}$ row, and two FDs, namely the FDs 16n+1 and 16n+3 are connected to the FD 16n+2 in the n+2$^{th}$ row. At this time, the FD capacitances in the n−2$^{th}$ row, the n$^{th}$ row, and the n+2$^{th}$ row are 3×Cf, Cf, and 3×Cf, respectively, and a weighting ratio of 1:3:1 is obtained. Here, the gain applied by the correction circuit 110 is 1.8.

Fourth Embodiment

Next, a fourth embodiment of the present invention will be described with reference to FIGS. 11, 12A and 12B. In a Bayer pattern, the sampling frequency of G pixels is higher than that of R pixels and B pixels, and there is a tendency that moiré is unlikely to occur in a G pixel. For this reason, in the fourth embodiment, the center pixel at the time of merging output signals of G pixels is strongly weighted, as compared with the weighting for R pixels and B pixels.

Figure 11:
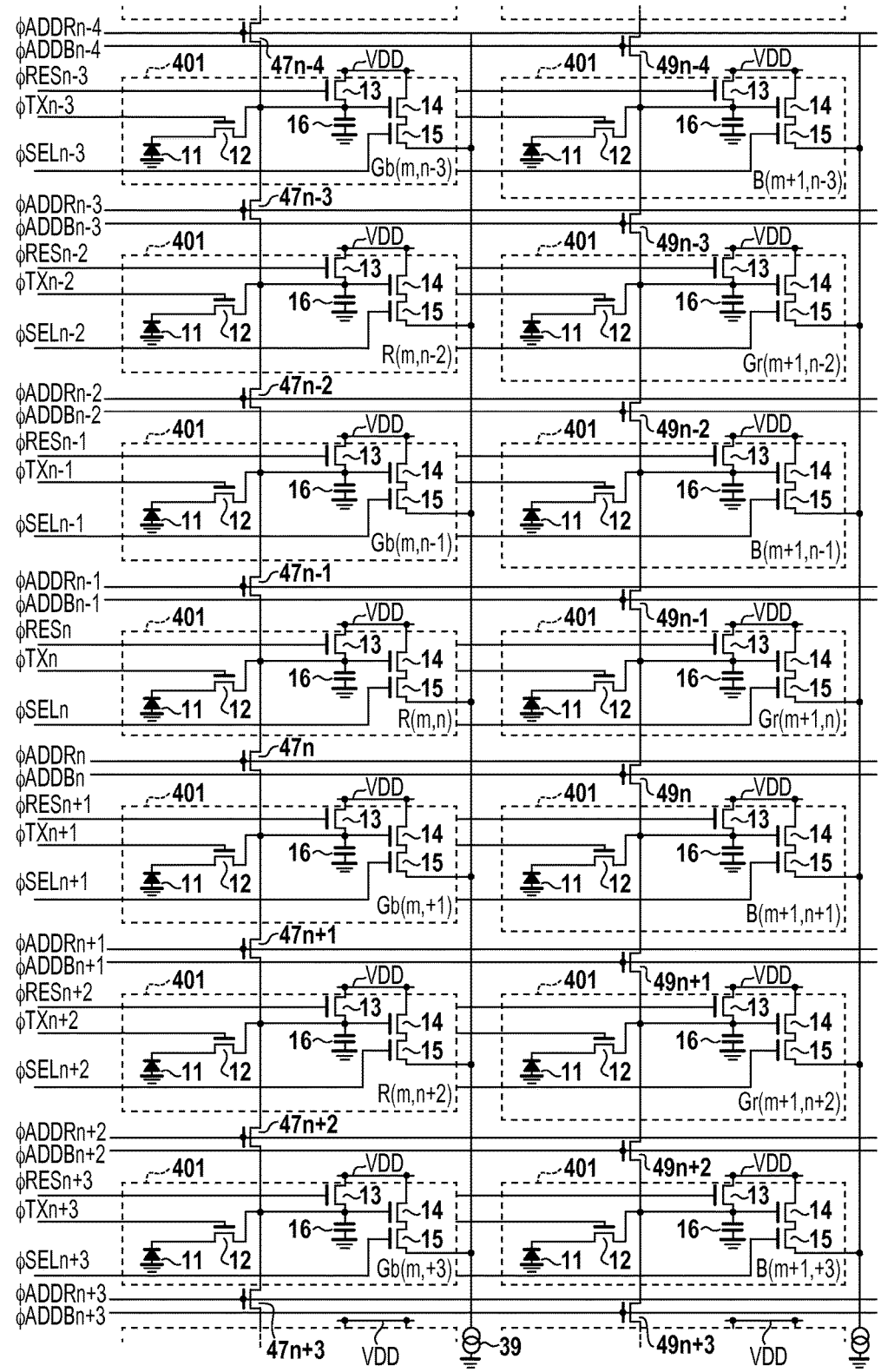
FIG. 11 is a diagram showing a circuit configuration of pixels according to a fourth embodiment.

FIG. 11 shows a circuit configuration of pixels 401 according to the fourth embodiment. Note that the circuit configuration in the fourth embodiment is different, in the following point, from the circuit configuration described with reference to FIG. 9 in the third embodiment. That is to say, a signal for driving a capacitance changeover switch 47 in an R-Gb column is independent from a signal for driving a capacitance changeover switch 49 in a Gr-B column. With this configuration, when in the merged readout mode for an R-Gr row, the weighting ratios for an R column and a Gr column can be separately set. Similarly, when in the merged readout mode for a Gb-B row, the weighting ratios for a Gb column and a B column can also be separately set.

Although the details of the driving will be described later using FIGS. 12A and 12B, the capacitance changeover switch 47 in an R-Gb column and the capacitance changeover switch 49 in a Gr-B column are driven by drive signals ϕADDR and ϕADDB, respectively, supplied from the vertical scanning circuit 109. Note that configurations similar to the configurations described with reference to FIG. 2 in the first embodiment will be given the same reference numerals, and a description thereof will be omitted. When a signal or configuration "of an n$^{th}$ row" and/or "of an m$^{th}$ column" is specified in the following description, a suffix "n" and/or "m" will be added at the end of the reference numeral denoting the signal or configuration. For example, "a signal ϕTX of the n$^{th}$ row" will be written with the suffix n as "a signal ϕTXn". Similarly, a suffix "n−1" will be added to indicate "an n−1$^{th}$ row", and a suffix "n+1" will be added to indicate "an n+1$^{th}$ row". Furthermore, "a pixel 401 in the n$^{th}$ row and the m$^{th}$ column" will be described also with a suffix "m" as "a pixel 401(m, n)".

Next, the driving of the pixels 401 will be described with reference to timing charts in FIGS. 12A and 12B. Note that the correction circuit 110 in the column readout circuit 106 is similar to that in the first embodiment, and accordingly a detailed description thereof will be omitted. FIG. 12A is a timing chart showing the driving at the time of reading out an R-Gr row in the merged readout mode according to the fourth embodiment, and FIG. 12B is a timing chart showing the driving at the time of reading out a Gb-B row in this mode.

Initially, the R-Gr row is read out in the period from time t31 to time t35. Signals ϕSELn−2, ϕSELn, and ϕSELn+2 are set to "H", and the respective row selection switches 15n−2, 15n, and 15n+2 are thereby turned on. In this period, the merging and output of signals of three pixels in the n−2$^{th}$ row, the n$^{th}$ row, and the n+2$^{th}$ row are performed.

Signals ϕADDRn−2 and ϕADDRn+1 are set to "H" with respect to the FD 16n−2 of the R pixel 401(m, n−2) and the FD 16n+2 of the R pixel 401(m, n+2), and the capacitance changeover switches 47n−2 and 47n+1 are thereby turned on. The FD 16n−1 of the Gb pixel 401(m, n−1) and the FD 16n+1 of the Gb pixel 401(m, n+1) are thereby connected respectively to the R pixel 401(m, n−2) and the R pixel 401(m, n+2).

On the other hand, signals ϕADDBn−3 and ϕADDBn−2 are set to "H" with respect to the FD 16n−2 of the Gr pixel 401(m+1, n−2), and the capacitance changeover switches 49n−3 and 49n−2 are thereby turned on. The FD 16n−3 of the B pixel 401(m+1, n−3) and the FD 16n−1 of the B pixel 401(m+1, n−1) are thereby connected to the Gr pixel 401(m+1, n−2). Also, signals ϕADDBn+1 and ϕADDBn+2 are set to "H" with respect to the FD 16n+2 of the Gr pixel 401(m+1, n+2), and the capacitance changeover switches 49n+1 and 49n+2 are thereby turned on. The FD 16n+1 of the B pixel 401(m+1, n+1) and the FD 16n+3 of the B pixel 401(m+1, n+3) are thereby connected to the Gr pixel 401 (m+1, n+2).

Here, assuming that all values of the capacitances of the FDs 16n−3 to 16n+3 are Cf and are equal, the FD capacitance in the n$^{th}$ row is Cf, whereas the FD capacitance in the n−2$^{th}$ row and the n+2$^{th}$ row is 2×Cf in an R pixel, and is 3×Cf in a Gr pixel. Accordingly, the weighting ratios for an R pixel and a Gr pixel are 1:2:1 and 1:3:1, respectively, and the weighting of a center Gr pixel can be made stronger than that of a center R pixel. In the following description, common driving is performed for both an R-Gb column and a Gr-B column.

In the period from time t31 to time t32, signals φRESn−2, φRESn, and φRESn+2 are set to "H", the respective reset switches 13n−2, 13n, and 13n+2 are turned on, and reset voltage is applied to the corresponding FDs 16. In the same period, signals φRESn−3, φRESn−1, φRESn+1, and φRESn+3 for driving the respective reset switches 13n−3, 13n−1, 13n+1, and 13n+3 corresponding to the FDs 16n−3, 16n−1, 16n+1, and 16n+3 are set to "H".

Note that, as mentioned in the third embodiment, if the reset switches 13n−2 and 13n+2 can sufficiently drive the reset of a plurality of FDs 16, the signals φRESn−3, φRESn−1, φRESn+1, and φRESn+3 may be "L".

In the period from time t32 to time t33, the reset voltages of the FDs 16n−2, 16n, and 16n+2 are averaged in the vertical output line 38 through the respective SFs 14, and the averaged voltage is output to the correction circuit 110.

In the period from time t33 to time t34, signals φTXn−2, φTXn, and φTXn+2 are set to "H", and the respective transfer switches 12n−2, 12n, and 12n+2 are turned on. Signal charges accumulated in the PDs 11n−2, 11n, and 11n+2 due to the image sensing of a subject image are thereby transferred to the respective FDs 16n−2, 16n, and 16n+2.

At this time, the signal charges transferred from PDs 11n in the pixels 401(m, n) and 401(m+1, n) are accumulated in the corresponding FDs 16n, in both cases of an R pixel and a Gr pixel. On the other hand, the signal charge transferred from the PD 11n−2 in the pixel 401(m, n−2) is accumulated in the FDs 16n−2 and 16n−1, and the signal charge transferred from the PD 11n−2 in the pixel 401(m+1, n−2) is accumulated in the FDs 16n−3, 16n−2, and 16n−1. Similarly, the signal charge transferred from the PD 11n+2 in the pixel 401(m, n+2) is accumulated in the FDs 16n+1 and 16n+2, and the signal charge transferred from the PD 11n+2 in the pixel 401(m+1, n+2) is accumulated in the FDs 16n+1, 16n+2, and 16n+3.

Here, assuming that the signal charges in the PDs 11n−2, 11n, and 11n+2 are Qb, Qd, and Qf, respectively, the signal voltages to be input to gates of the respective SFs 14n−2, 14n, and 14n+2 are Qb/(2×Cf), Qd/Cf, and Qf/(2×Cf), respectively, in the R-Gb column. On the other hand, these signal voltages are Qb/(3×Cf), Qd/Cf, and Qf/(3×Cf), respectively, in the Gr-B column, and the center pixel in the Gr-B column is more strongly weighted than in the case of the R-Gb column.

In the period from time t34 to time t35, the weighted average of the above signal voltages is obtained in the vertical output line 38 and is output to the correction circuit 110. In the correction circuit 110 in the R-Gb column, if the output range is to be adjusted to the output range in the normal readout mode with the FD capacitance of Cf, Cv=2/3×C1 is set since the applied gain is 1.5. On the other hand, in the correction circuit 110 in the Gr-B column, Cv=5/9×C0 is set since the applied gain is 1.8. The weighted output signal merging in units of pixels in three rows is performed by the above driving, n=n+2 is then set as the next row to be subjected to the merged readout, and the driving for the merged readout of the Gb-B row is performed.

FIG. 12B is a timing chart showing the driving at the time of reading out a Gb-B row in the merged readout mode according to the fourth embodiment. Note that the driving in FIG. 12B is similar to the driving in FIG. 12A except for a part, and accordingly only a difference therebetween will be described in detail.

During readout of the R-Gr row, the weighting ratio of a Gr pixel is controlled with φADDB. That is to say, in the period from time t31 to time t35 in FIG. 12A, φADDBn−3 and φADDBn+2 are set to "H", and the weighting ratio of a center Gr pixel is made stronger than that of an R pixel.

On the other hand, during readout of the Gb-B row, the weighting ratio of a Gb pixel is controlled with φADDR. Accordingly, in the period from time t36 to time t40 in FIG. 12B, φADDRn−3 and φADDRn+2 are set to "H", and the weighting ratio of the center Gb pixel is made stronger than that of a center B pixel.

The other part of the driving is similar to that in FIG. 12A, and the output signal merging is performed with B pixels at a weighting ratio of 1:2:1, which is equal to the weighting ratio for R pixels. At this time, in the correction circuit 110 of a Gr-B column, if the output range is to be adjusted to the output range in the normal readout mode with the FD capacitance of Cf, Cv=2/3×C0 is set since the applied gain is 1.5. Also, the output signal merging is performed with Gb pixels at a weighting ratio of 1:3:1, which is equal to the weighting ratio for Gr pixels. At this time, in the correction circuit 110 in the R-Gb column, Cv=5/9×C0 is set since the applied gain is 1.8.

As described above, the weighting ratio of a signal of a center G pixel can be made stronger than that of an R or B pixel by independently driving the capacitance changeover switches in the R-Gb column and the Gr-B column and performing control using the signals φADDR and φADDB.

Fifth Embodiment

A fifth embodiment of the present invention will be described with reference to FIG. 13. In the fourth embodiment, the drive signals for the capacitance changeover switches 47 and 49 in the R-Gb column and the Gr-B column are independent from each other. The fifth embodiment will describe an example in which, further considering the merging of output signals of three horizontally-arranged pixels, drive signals for the capacitance changeover switches in a center pixel column and in pixel columns located to the left and right thereof are independent from each other. By employing this configuration, the weighting of a center pixel can also be achieved in the horizontal direction. Note that the circuit configuration of pixels 501 in the fifth embodiment is similar to the circuit configuration of the pixels 401 described with reference to FIG. 11 in the fourth embodiment, and accordingly a detailed description thereof will be omitted. Also, since the driving in the merged readout mode is similar except for a drive signal for the capacitance changeover switches, only a difference will be described.

Figure 13:
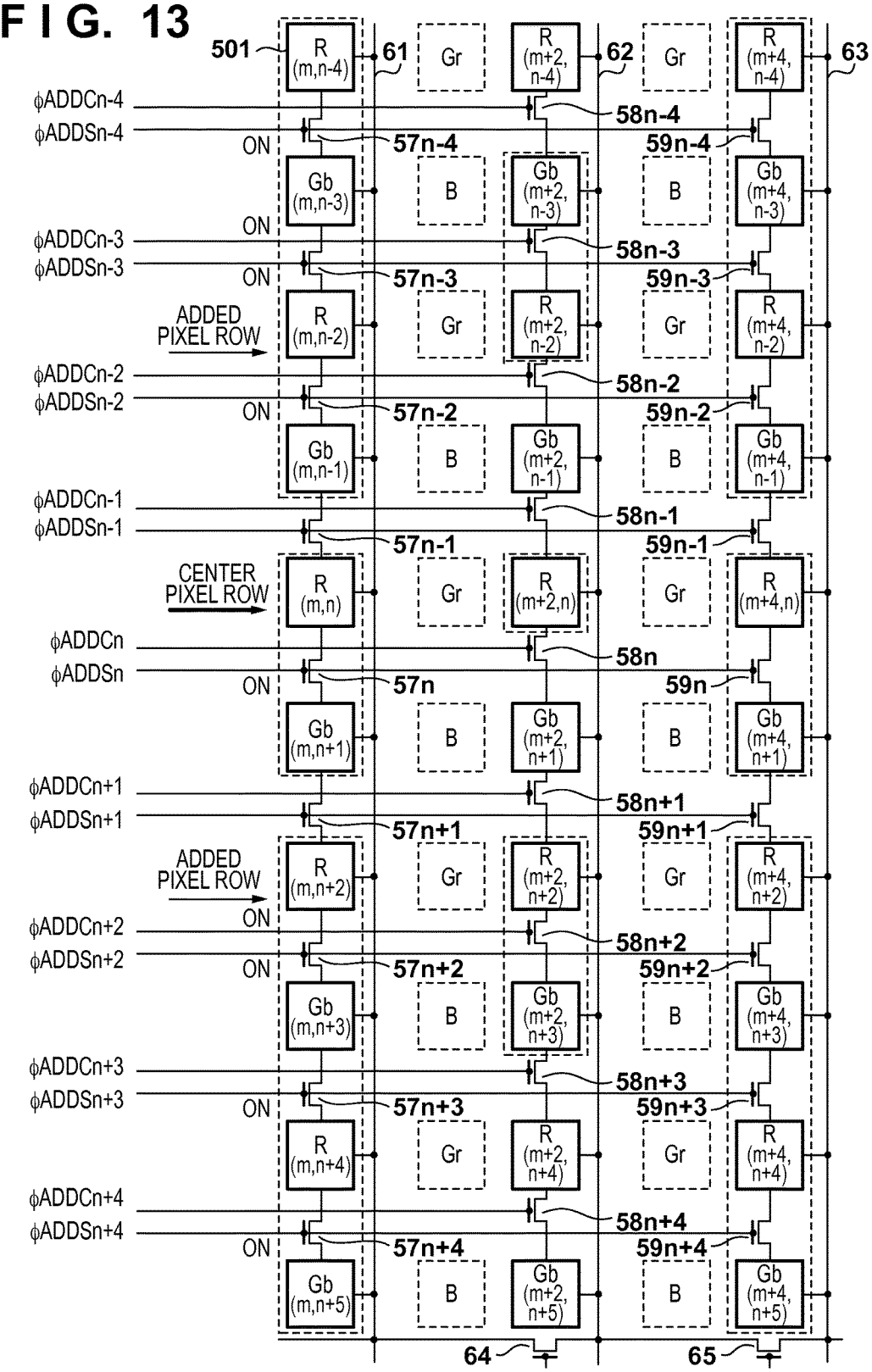
FIG. 13 is a diagram for illustrating driving in a merged readout mode according to a fifth embodiment.

FIG. 13 is a diagram illustrating the driving of capacitance changeover switches 57n−4 to 57n+4, 58n−4 to 58n+4, and 59n−4 to 59n+4 when in the merged readout mode for 3×3 R pixels, namely the R pixels 501(m, n−2), 501(m, n), 501(m, n+2), 501(m+2, n−2), 501(m+2, n), 501(m+2, n+2), 501(m+4, n−2), 501(m+4, n), and 501(m+4, n+2). FIG. 13 also shows an example of performing the merging of pixel output signals in the horizontal direction at a weighting ratio of 1:2:1, in addition to the merging in the vertical direction at a weighting ratio of 1:2:1. Note that, in FIG. 13, pixels in Gr-B columns that are not related to the merging when reading out the R pixels 501 are denoted by dotted lines.

In the case where the R pixel 501($m+2$, n) is the center of the pixels to be merged, the weighting ratio is changed for the R pixels 501($m+2$, n−2), 501($m+2$, n), and 501($m+2$, n+2) that are located in a center column, the R pixels 501($m$, n−2), 501($m$, n), and 501($m$, n+2) that are located in a left column, and the R pixels 501($m+4$, n−2), 501($m+4$, n), and 501($m+4$, n+2) that are located in a right column. A signal φADDC is supplied to the capacitance changeover switches 58$n$−4 to 58$n$+4 in the pixel column including the R pixels 501($m+2$, n−2), 501($m+2$, n), and 501($m+2$, n+2) to drive these pixels.

In the case where the row of the R pixel 501($m+2$, n) is an $n^{th}$ row, in the period of the merged readout mode for the $n^{th}$ row, signals φADDCn−3 and φADDCn+2 are set to "H", and the capacitance changeover switches 58$n$−3 and 58$n$+2 are thereby turned on. At this time, assuming the FD capacitance of each pixel is Cf, the FD capacitances of the R pixels 501($m+2$, n−2), 501($m+2$, n), and 501($m+2$, n+2) are 2×Cf, Cf, and 2×Cf, respectively.

On the other hand, a signal φADDS is supplied to the capacitance changeover switches 57$n$−4 to 57$n$+4 in the pixel column including the R pixels 501($m$, n−2), 501($m$, n), and 501($m$, n+2) to drive these pixels. In the period of the merged readout mode for the $n^{th}$ row, signals φADDSn−4, φADDSn−3, φADDSn−2, φADDSn, φADDSn+2, φADDSn+3, and φADDSn+4 are set to "H". The capacitance changeover switches 57$n$−4 to 57$n$−2, 57$n$, and 57$n$+2 to 57$n$+4 are thereby turned on. At this time, the FD capacitances of the R pixels 501($m$, n−2), 501($m$, n), and 501($m$, n+2) are 4×Cf, 2×Cf, and 4×Cf, respectively.

A signal φADDS is supplied to the capacitance changeover switches 59$n$−4 to 59$n$+4, as in the case of the capacitance changeover switches 57$n$−4 to 57$n$+4, in the pixel column including the R pixels 501($m+4$, n−2), 501($m+4$, n), and 501($m+4$, n+2) to drive these pixels. At this time, the FD capacitances of the R pixels 501($m+4$, n−2), 501($m+4$, n), and 501($m+4$, n+2) are 4×Cf, 2×Cf, and 4×Cf, respectively.

Here, when focusing on the FD capacitance in a horizontal pixel row, the FD capacitances of the R pixels 501($m$, n), 501($m+2$, n), and 501($m+4$, n) in the center pixel row are 2×Cf, Cf, and 2×Cf, respectively. On the other hand, the FD capacitances of the R pixels 501($m$, n−2), 501($m+2$, n−2), and 501($m+4$, n−2) in a pixel row located above the center pixel row are 4×Cf, 2×Cf, and 4×Cf, respectively. The FD capacitances of the R pixels 501($m$, n+2), 501($m+2$, n+2), and 501($m+4$, n+2) in a pixel row located below the center pixel row are also 4×Cf, 2×Cf, and 4×Cf, respectively. Accordingly, the weighting of the center pixel signal can also be achieved in the horizontal direction, in addition to the vertical direction. At this time, if the output range is to be adjusted to the output range in the normal readout mode with the FD capacitance of Cf, Cv=4/9×C0 is set since the applied gain is 9/4.

As described above, at the time when signals are output to the vertical output lines 61 to 63, the weighting has been performed in advance in the horizontal direction. Accordingly, the merged output in which the center pixel signal is weighted can be obtained in both the vertical and horizontal directions, by providing a simple adding circuit to the column circuit 106.

As an example of the simple adding circuit, connection switches 64 and 65 are provided with respect to the vertical output lines 61, 62, and 63 in the columns with which the merged output is to be obtained, as shown in FIG. 13, and are turned on to connect these vertical output lines, thereby dealing with the vertical output lines 61 to 63 as a single output line. By performing the merged readout mode in this state, nine R pixels, namely the R pixels 501($m$, n−2), 501($m$, n), 501($m$, n+2), 501($m+2$, n−2), 501($m+2$, n), 501($m+2$, n+2), 501($m+4$, n−2), 501($m+4$, n), and 501($m+4$, n+2) simultaneously output signals to the single output line, and the output signal merging is performed with respect to the column readout circuit 106.

The merging can also be performed by the column readout circuit 106. In this case, the merging can also be achieved by providing S/H capacitors for storing signals read out from respective columns by the column readout circuit 106, and connecting, with a switch or the like, the S/H capacitors in the columns with which the output signal merging is to be performed. The S/H capacitors to be used here may be S/H capacitors used in the normal readout mode.

Sixth Embodiment

Figure 14:
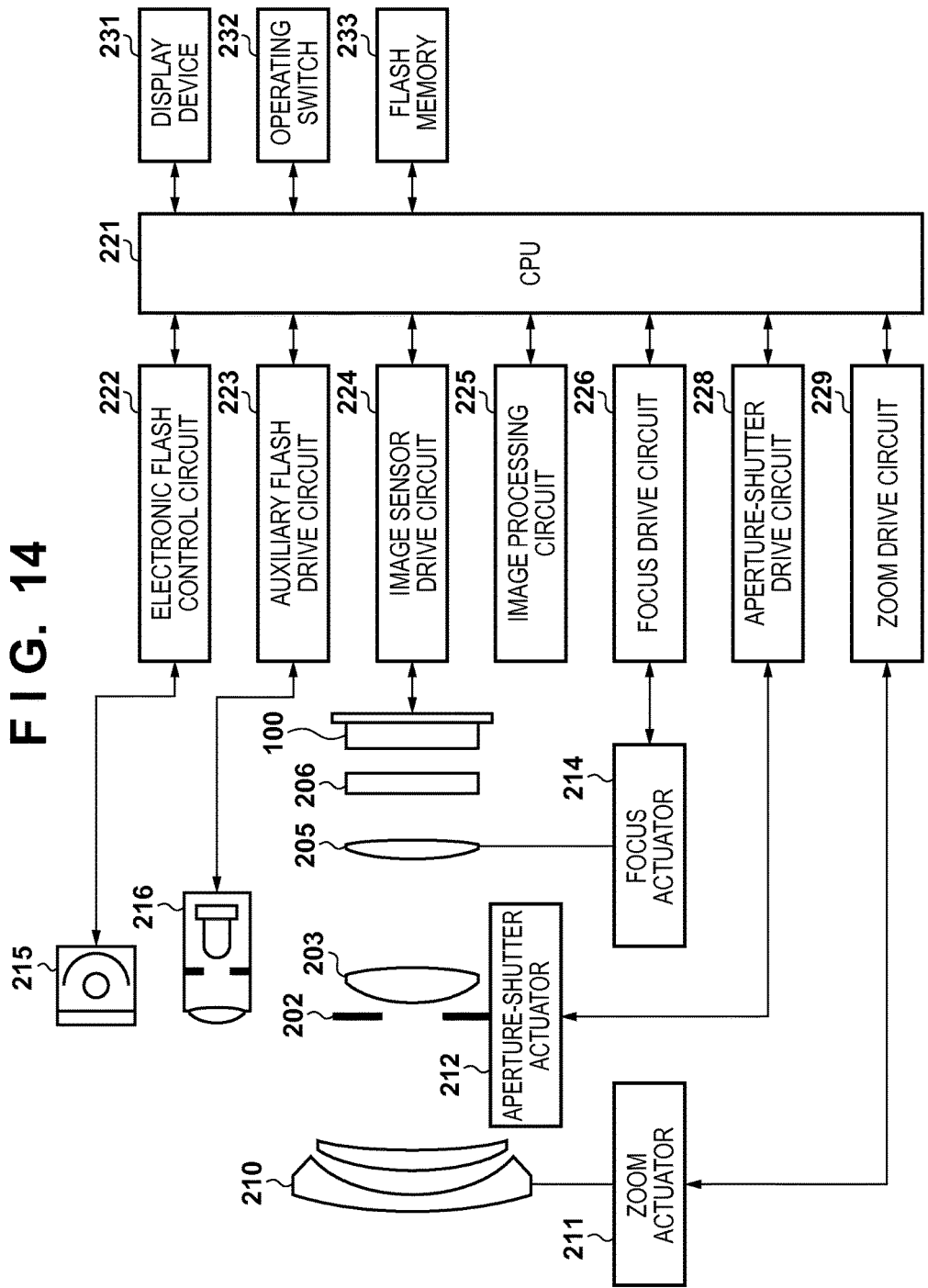
FIG. 14 is a schematic block diagram of an image capturing apparatus according to a sixth embodiment.

Next, a sixth embodiment of the present invention will be explained. FIG. 14 is a diagram showing a brief configuration of a camera as an example of an image capturing apparatus having an image sensor according to the first to fifth embodiments of the present invention. In FIG. 14, a first lens group 210 is disposed on the front end of an imaging optical system, and supported so as to be reciprocally movable along an optical axis. An aperture-shutter 202 adjusts the diameter of its opening, thereby adjusting the amount of light during image sensing, and also has a function to adjust the exposure time during still image shooting. The aperture-shutter 202 and a second lens group 203 reciprocally move together along the optical axis, and, in conjunction with the reciprocal movement of the first lens group 210, provide a magnification change effect (a zoom function).

A third lens group 205 (focus lens) carries out focus adjustment by reciprocally moving along the optical axis. A low-pass optical filter 206 is an optical element for the purpose of reducing false color and moiré of a sensed image. An image sensor 100 is composed of a two-dimensional CMOS photo sensor and a surrounding circuitry, and disposed on an imaging plane of the imaging optical system. The first lens group 210, the aperture-shutter 202, the second lens group 203, the third lens group 205, and the low-pass optical filter 206 constitute the imaging optical system.

A zoom actuator 211 carries out a magnification-change operation by rotation of a cam barrel, not shown, to reciprocally drive the first lens group 210 through the second lens group 203 along the optical axis. An aperture-shutter actuator 212 controls the diameter of the opening of the aperture-shutter 202 and adjusts the amount of light for image sensing, and also controls the exposure time during still image shooting. A focus actuator 214 reciprocally drives the third lens group 205 along the optical axis to adjust the focus.

An electronic flash 215 for illuminating a subject is used during image sensing. A flash illumination device that uses a Xenon tube is preferable, but an illumination device comprised of a continuous-flash LED may also be used. An AF auxiliary flash unit 216 projects an image of a mask having a predetermined opening pattern onto an object field through a projective lens to improve focus detection capability with respect to dark subjects and low-contrast subjects.

A CPU 221 controls the camera main unit in various ways within the image capturing apparatus. The CPU 221 may, for example, have a calculation unit, ROM, RAM, A/D converter, D/A converter, communication interface circuitry, and so forth. In addition, the CPU 221, based on predetermined programs stored in the ROM, drives the various circuits that the camera has, and executes a set of operations of AF, image sensing, image processing, and recording. Further, focus detection correction values corresponding to states of the imaging optical system are also stored in the present invention.

A plurality of focus detection correction values are prepared for each of focus states corresponding to the positions of the third lens group 205, each of zoom states corresponding to the positions of the first lens group 210, and each of F numbers of the imaging optical system. Upon performing focus control, which will be described later, using an output signal from the image sensor 100, the optimum focus detection correction value that corresponds to the positions of the first lens group 210 and the third lens group 205 of the imaging optical system and the F number will be selected.

It should be noted that the focus detection correction values are stored in the CPU 221 in the present invention, however, the present invention is not limited to this. For example, in a lens-exchangeable type image capturing apparatus, an exchangeable lens having the imaging optical system may have a nonvolatile memory, and the focus detection correction values may be stored in the memory. In such case, the focus detection correction values will be sent to the image capturing apparatus.

An electronic flash control circuit 222 controls firing of the electronic flash 215 in synchrony with an image sensing operation. An auxiliary flash drive circuit 223 controls firing of the AF auxiliary flash unit 216 in synchrony with a focus detection operation. An image sensor drive circuit 224 controls the image sensing operation of the image sensor 100 as well as A/D-converts acquired image signals and transmits the converted image signals to the CPU 221. An image processing circuit 225 performs such processing as γ conversion, color interpolation, JPEG compression and the like on the images acquired by the image sensor 100.

A focus drive circuit 226 controls the drive of the focus actuator 214 based on the focus detection result to drive the third lens group 205 reciprocally in the optical axis direction, thereby performing focus adjustment. An aperture-shutter drive circuit 228 controls the drive of the aperture-shutter actuator 212, thereby driving the opening of the aperture-shutter 202. A zoom drive circuit 229 drives the zoom actuator 211 in accordance with the zoom operation of the user.

A display device 231, such as an LCD, displays information relating to the image sensing mode of the camera, preview images before image sensing, confirmation images after image sensing, an index of the focus detection area and focus state display images during focus detection, and the like. An operating switch group 232 is composed of a power switch, a release (image capturing trigger) switch, a zoom operation switch, an image sensing mode selection switch, and the like. A detachable flash memory 233 records captured images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-081435, filed Apr. 10, 2014 which is hereby incorporated by reference herein in its entirety.

What is claimed is:

1. An image sensor having a pixel unit in which a plurality of pixels are two-dimensionally arranged, and a scanning unit that selects pixels in the pixel unit in units of row and causes signals to be output from pixels in the selected row or rows,
   each of the pixels comprising:
      a photoelectric converter configured to generated signal charge corresponding to an amount of incident light;
      a storage portion configured to store a charge;
      a transfer portion configured to transfer a signal charge generated by the photoelectric converter to the storage portion, if each of the pixels is included in the row or rows selected by the scanning unit; and
      an output portion configured to output a pixel signal corresponding to the signal charge transferred to the storage portion,
   wherein, in a merged readout mode in which a plurality of rows are selected at a time by the scanning unit, pixels signals output from pixels in the selected rows are merged in each column and the merged pixel signal is read out, a capacitance of the storage portion of a pixel in row or rows except a predetermined row among the plurality of selected rows is different from a capacitance of the storage portion in a pixel in the predetermined row.

2. The image sensor according to claim 1, wherein the capacitance of the storage portion of the pixel in the row or rows except the predetermined row is larger than the capacitance of the storage portion of the pixel in the predetermined row.

3. The image sensor according to claim 2, wherein the storage portion of the pixel in the row or rows except the predetermined row is constituted by a storage portion having a larger capacitance than the capacitance of the storage portion of the pixel in the predetermined row.

4. The image sensor according to claim 2, wherein the storage portion in each of the pixels has a plurality of charge storage portions, and a switching portion configured to switch between connection and disconnection among the plurality of charge storage portions, and
   in the merged readout mode, the capacitance of the storage portion is increased by connecting the plurality of charge storage portions of the pixel in the row or rows except the predetermined row, using the switching portion.

5. The image sensor according to claim 2, wherein each of the pixels further comprises a switching portion configured to switch between connection and disconnection to the storage portion of an adjoining pixel, and
   in the merged readout mode, the capacitance of the storage portion is increased by the switching portion connecting the storage portion of the pixel in the row or rows except the predetermined row to the storage portion of a pixel in a row adjoining the plurality of selected rows.

6. The image sensor according to claim 5, wherein the storage portion of the pixel in the row or rows except the predetermined row is connected, by the switching portion, to the storage portion of one or more pixels, the number of which in one column is different from that in an adjoining column.

7. The image sensor according to claim 5 further comprising an merging unit configured to merge signals output from pixels in the selected rows in units of predetermined numbers of columns, in the merged readout mode,
wherein the number of storage portions to be connected to column or columns except a predetermined column among the plurality of columns is made larger, by the switching portion, than the number of storage portions to be connected to the predetermined column.

8. The image sensor according to claim 7, wherein the predetermined column is a center column among the plurality of columns.

9. The image sensor according to claim 1, wherein the predetermined row is a center row among the plurality of selected rows.

10. The image sensor according to claim 1, wherein the scanning unit further performs driving in a sequential readout mode in which pixels are selected row-by-row and a pixel signal is caused to output from each row, and drives the pixel unit while switching between the sequential readout mode and the merged readout mode.

11. The image sensor according to claim 1 further comprising a correction unit configured to correct an output range of a pixel signal obtained in the merged readout mode, in accordance with a capacitance of the storage portion.

12. The image sensor according to claim 1, wherein Bayer pattern color filters are arranged in the pixel unit, and
in the merged readout mode, the scanning unit selects the plurality of rows of pixels in which color filters of the same color are arranged.

13. The image sensor according to claim 12, wherein, in the merged readout mode, the capacitance of the storage portion is changed with respect to each color of the color filters.

14. An image capturing apparatus comprising:
the image sensor according to claim 1; and
a processing unit configured to process a pixel signal output from the image sensor.

* * * * *